United States Patent
Behera et al.

(10) Patent No.: US 12,348,303 B2
(45) Date of Patent: Jul. 1, 2025

(54) ACCURATE CLOCK SYNCHRONIZATION AND LOCATION DETECTION IN TIME-SENSITIVE WIRELESS NETWORKS

(71) Applicant: SpearIx Technologies, Inc., Cedar Park, TX (US)

(72) Inventors: Manas Behera, Cedar Park, TX (US); Chandra B. Prakash, Austin, TX (US)

( * ) Notice: Subject to any disclaimer, the term of this patent is extended or adjusted under 35 U.S.C. 154(b) by 347 days.

(21) Appl. No.: 17/877,783

(22) Filed: Jul. 29, 2022

(65) Prior Publication Data
US 2023/0030936 A1    Feb. 2, 2023

Related U.S. Application Data

(60) Provisional application No. 63/226,887, filed on Jul. 29, 2021.

(51) Int. Cl.
*H04J 3/06* (2006.01)
*G01S 5/02* (2010.01)

(52) U.S. Cl.
CPC .......... *H04J 3/0667* (2013.01); *G01S 5/0205* (2013.01)

(58) Field of Classification Search
CPC .............................. H04J 3/0667; G01S 5/0205
See application file for complete search history.

(56) References Cited

U.S. PATENT DOCUMENTS

| | | | |
|---|---|---|---|
| 5,773,815 A | 6/1998 | Stevens | |
| 7,369,599 B2 | 5/2008 | Patrick | |
| 9,223,028 B2 | 12/2015 | Sullivan | |
| 9,961,495 B2 * | 5/2018 | Katabi | H04W 4/023 |
| 10,469,184 B1 * | 11/2019 | Yu | G01S 13/84 |
| 10,656,263 B2 * | 5/2020 | Weissman | G01S 5/0036 |
| 10,681,668 B2 * | 6/2020 | Haatsen | G01S 11/02 |
| 10,994,821 B1 * | 5/2021 | Connor | B63G 8/001 |
| 11,513,209 B2 * | 11/2022 | Yu | H04J 3/0682 |
| 11,533,702 B1 * | 12/2022 | Choi | G01S 13/876 |
| 2020/0259896 A1 * | 8/2020 | Sachs | H04W 56/0065 |
| 2021/0382183 A1 * | 12/2021 | Kennedy | G01S 19/421 |

(Continued)

OTHER PUBLICATIONS

A. Mileant, S. Hinedi, "Costas Loop Lock Detection in the Advanced Receiver", TDA Progress Report 42--99, Nov. 15, 1989, pp. 72-89.

(Continued)

*Primary Examiner* — Bailor C Hsu
(74) *Attorney, Agent, or Firm* — André Grouwstra

(57) ABSTRACT

A transmitter at a first location transmits the message at a symbol rate of the reference clock using a first carrier, whose phase is locked to a phase of the reference clock and whose frequency is a first integer times a frequency of the reference clock. It also transmits the message at the symbol rate of the reference clock using a second carrier, whose phase is locked to the phase of the reference clock and whose frequency is a second integer times the frequency of the reference clock. The second integer is unequal to the first integer. A receiver at a second location receives the message at the first carrier and at the second carrier, and accurately determines a time of a first phase difference between the first carrier and the second carrier. It determines a time of receiving the message from the time of the first phase difference.

16 Claims, 12 Drawing Sheets

System

(56) References Cited

U.S. PATENT DOCUMENTS

| | | | |
|---|---|---|---|
| 2022/0240206 A1* | 7/2022 | Bao | G01S 13/878 |
| 2023/0188238 A1* | 6/2023 | Bartlett | H04J 3/0664 |
| | | | 370/503 |

OTHER PUBLICATIONS

S. Pal, P.K.Jain, V.M. Pandharipande, "Regenerate Coherent Carriers from PSK Signals", downloaded from mwrf.com on May 25, 2021.

* cited by examiner

100

| System | Radar | Sensor network | GPS | Pirate location |
|---|---|---|---|---|
| Method | 2-way TOA, angle | TDOA, TOA, 2-way TOA, | TDOA | Angle, TDOA |
| Anchor transmits | Yes | Yes (2-way TOA) | Yes | No |
| Tag responds | Yes, by reflection | Yes (2-way TOA) | No | N/A |
| Tag transmits | No | Yes (TDOA) | No | Yes |
| Anchor responds | N/A | N/A | No | No |
| No. of anchors | M | M+1, M | M+1 | M+1 |
| Anchors synchronized | No | Ref clock frequency + phase | Ref clock frequency + phase | Carrier frequency, signal |
| Tag synchronized | N/A | Ref frequency | Ref frequency | N/A |
| Position calculation | At anchors or common station | At common station | At tag | At common station or anchors |

FIG. 1 PRIOR ART

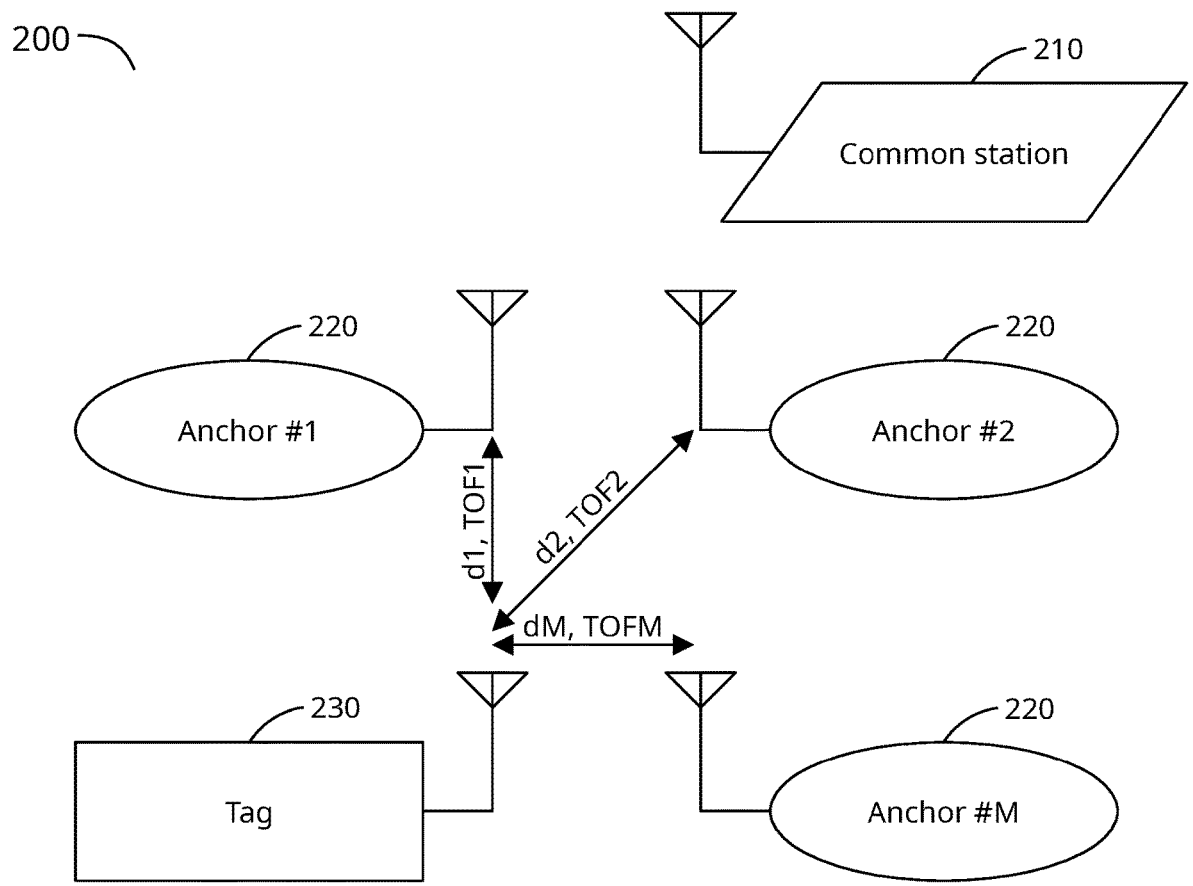
FIG. 2 - System
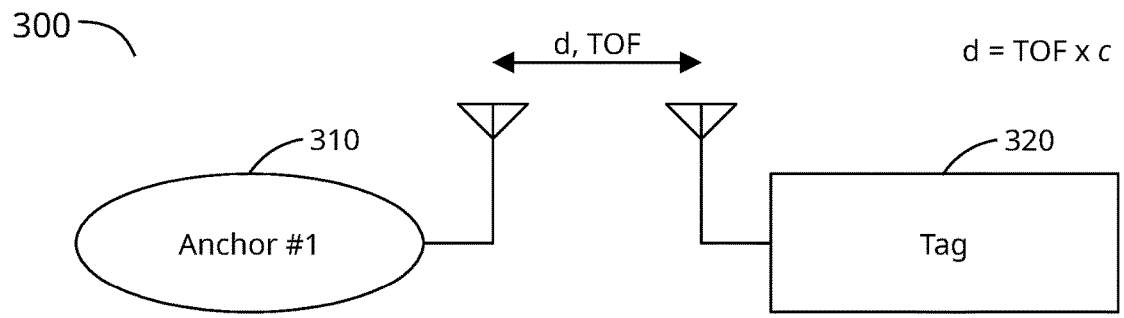
$$s_T(t) = A(t)u(t)e^{(j2\pi f_c t)}$$
$$s_R(t) = \sqrt{L_p}\,A(t-TOF)u(t-TOF)e^{(j2\pi f_c(t-TOF))} + n(t)$$
RSSI  code phase  sync detect  carrier phase
FIG. 3 - Distance vs Time

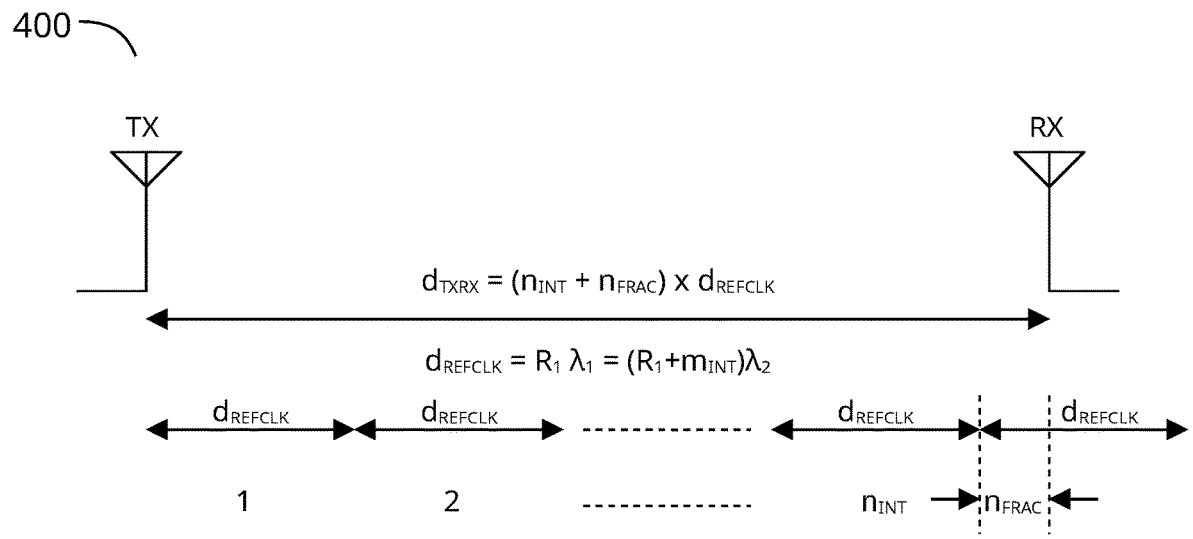

$d_{TXRX}$ = distance between transmit TX and receive RX
$d_{REFCLK}$ = wavelength (distance) of one reference clock cycle
$n_{INT}$ = integer number of $d_{REFCLK}$ within $d_{TXRX}$
$n_{FRAC}$ = fractional part of $d_{REFCLK}$
$\lambda_1$ = wavelength of first carrier
$\lambda_2$ = wavelength of second carrier
$R_1$ = number of wavelengths $\lambda_1$ within one $d_{REFCLK}$
$m_{INT}$ = difference (times reference clock frequency) of first and second carrier
$d$ = TOF x c = time of flight x speed of light

FIG. 4 - Distance

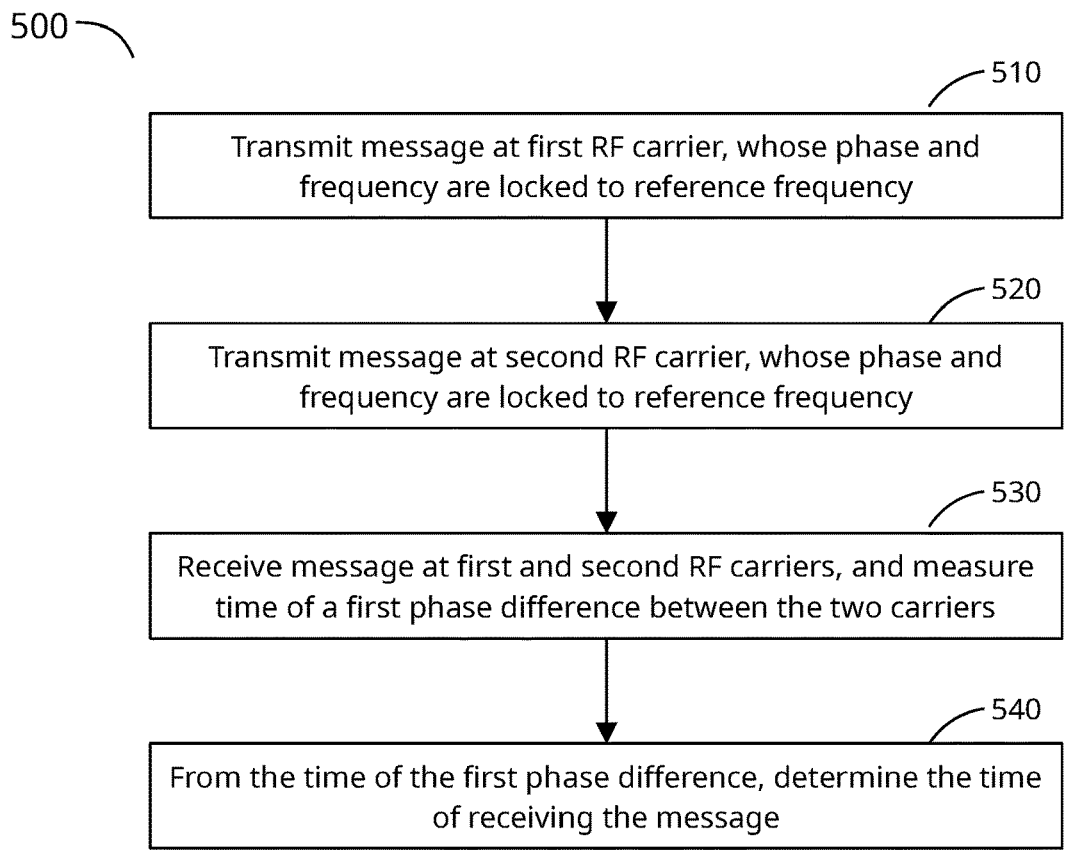
FIG. 5 - Transmitting and Receiving
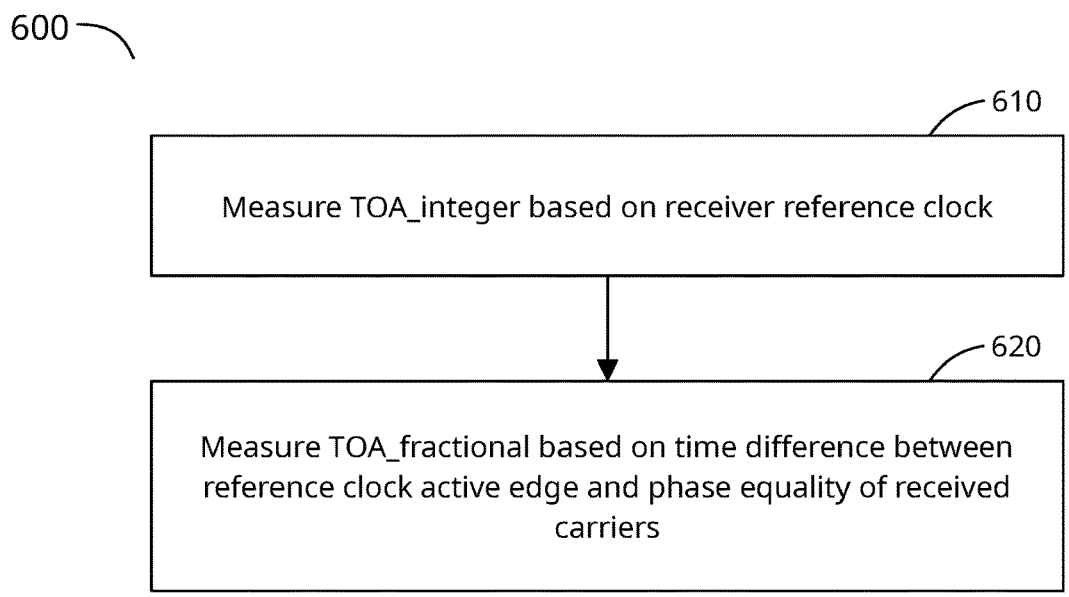
FIG. 6 - Measuring TOA

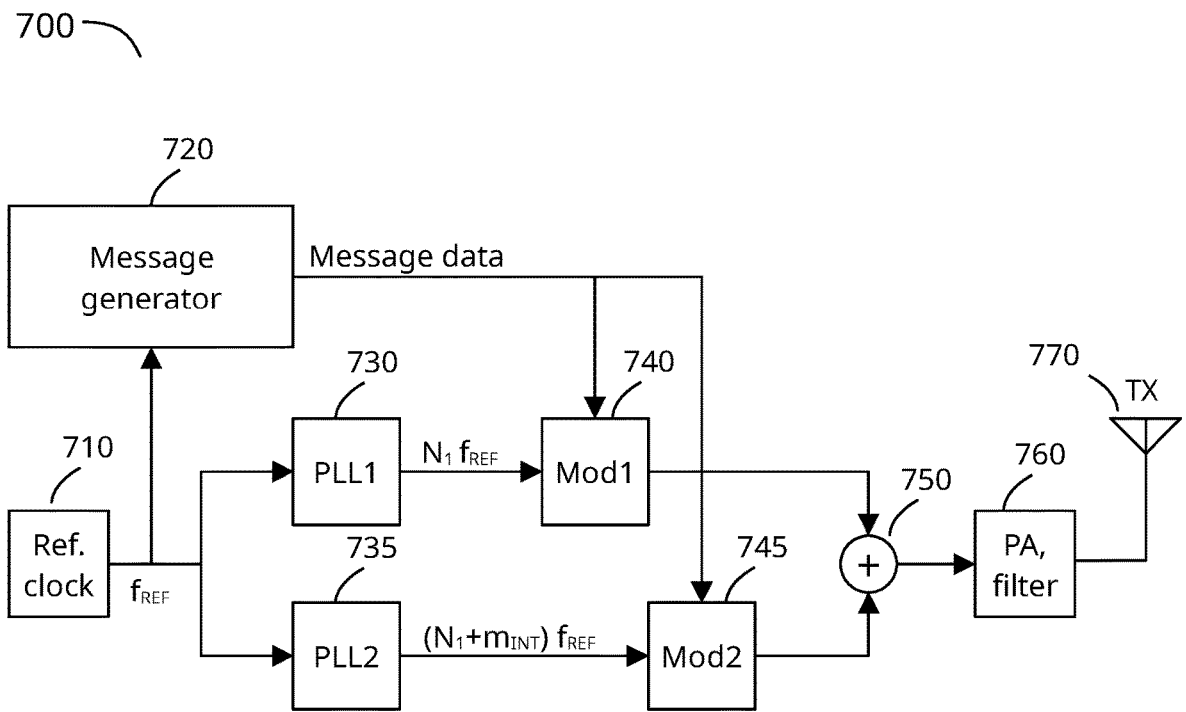
FIG. 7 - Transmitter
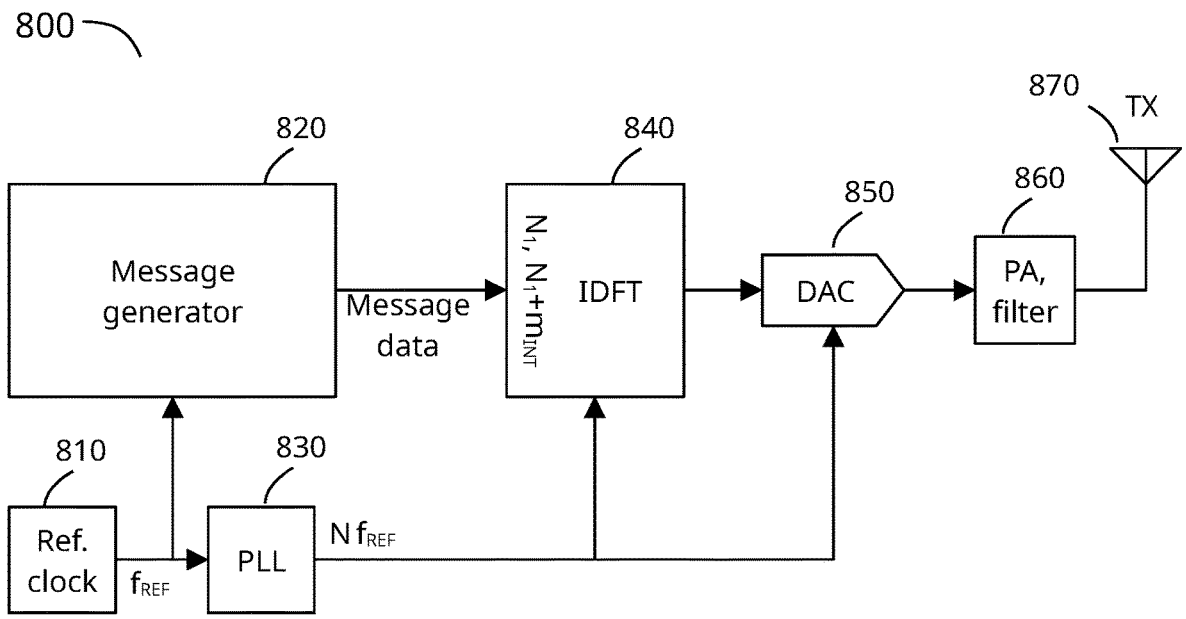
FIG. 8 - Transmitter

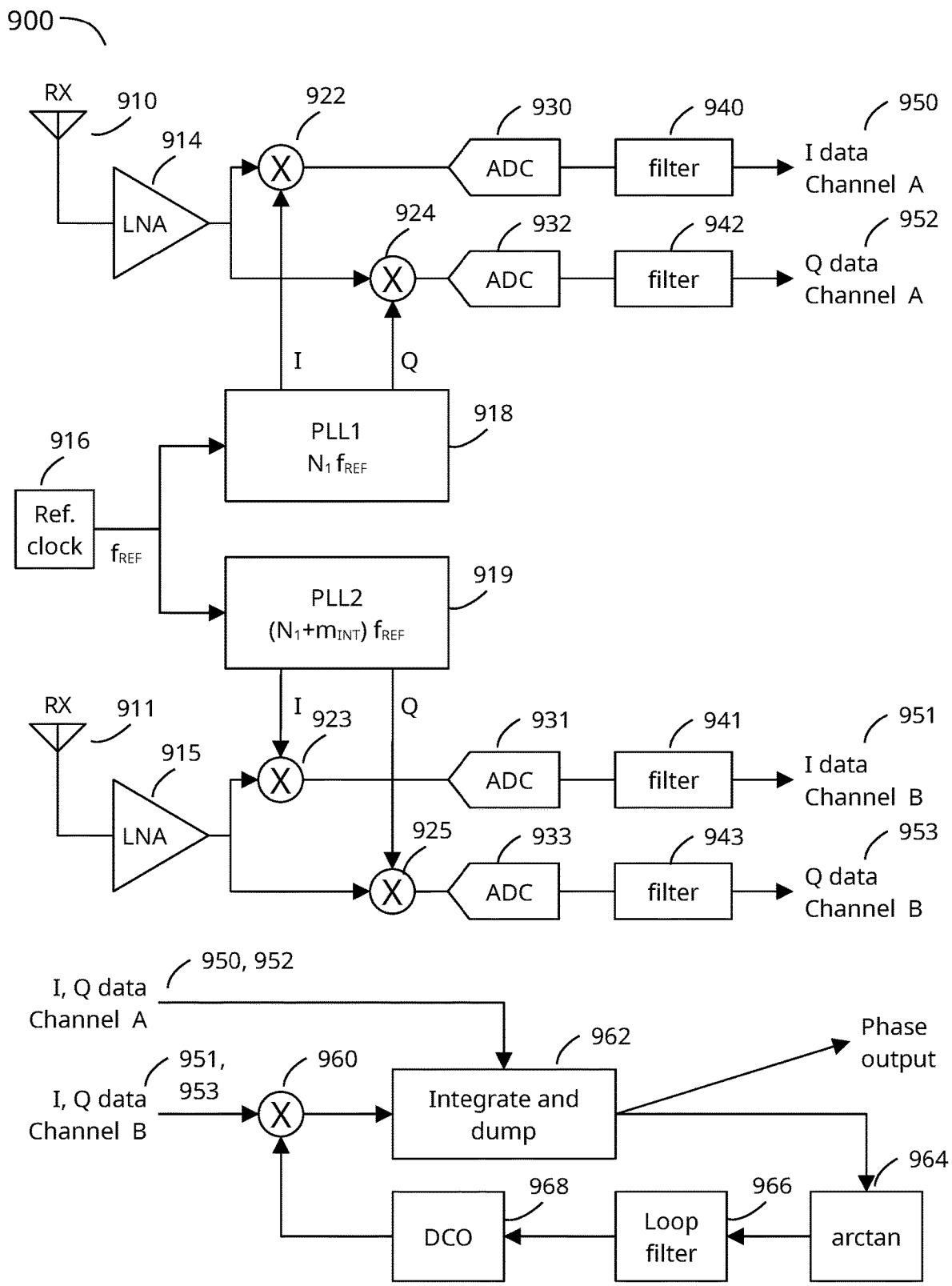
FIG. 9 - Receiver

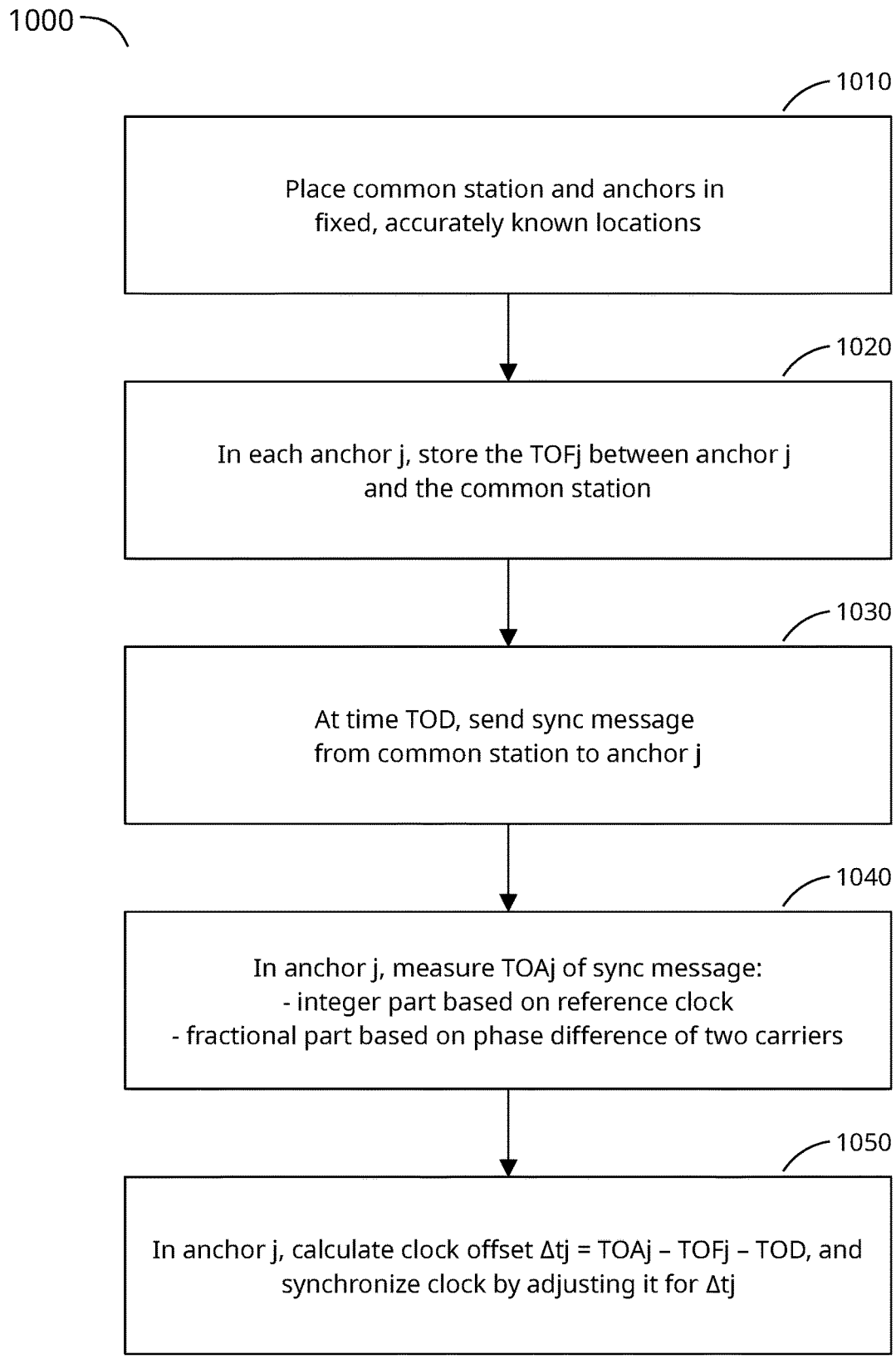
FIG. 10 - Anchor Synchronization with TOA

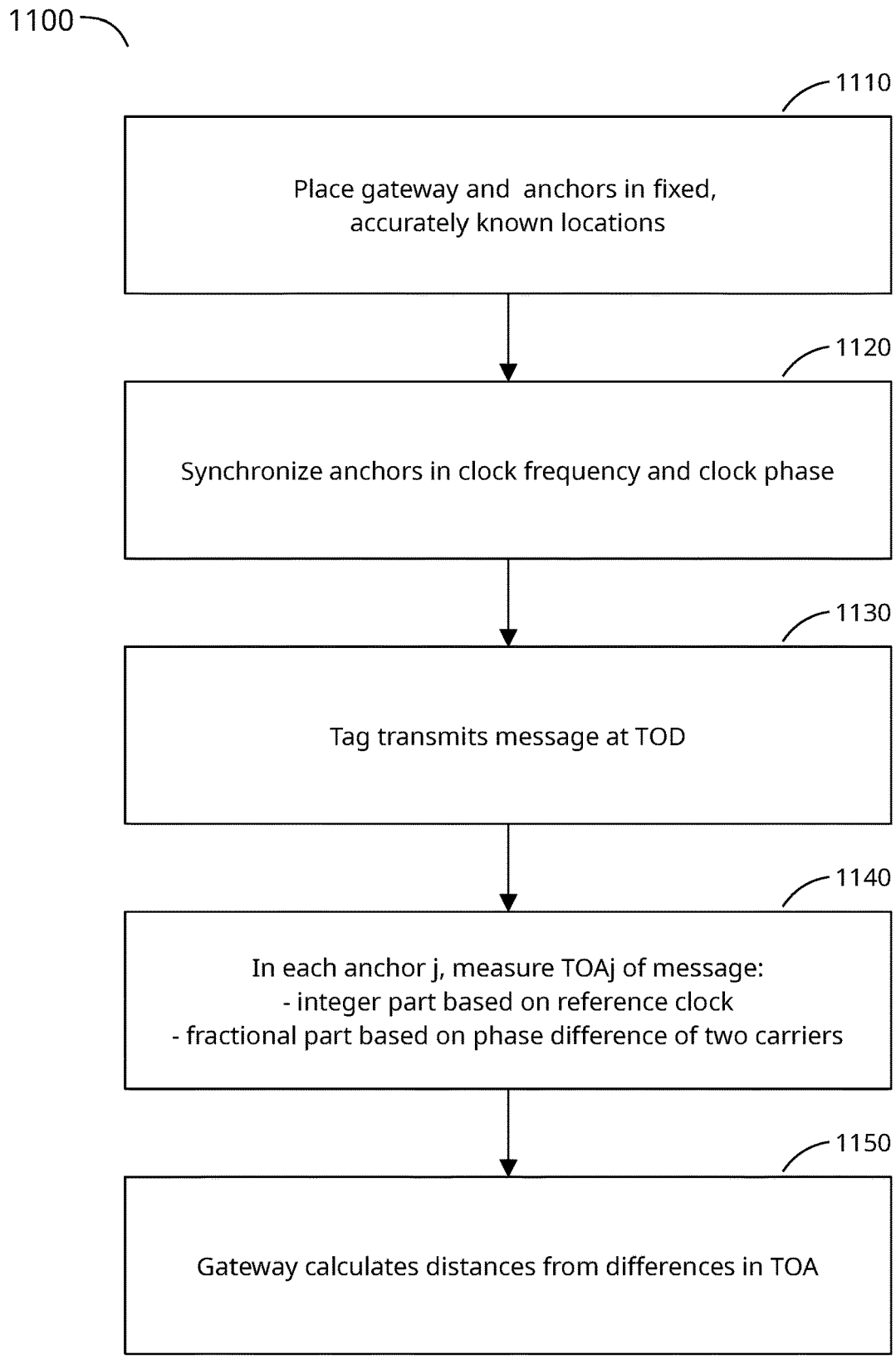
FIG. 11 - Positioning with TDOA

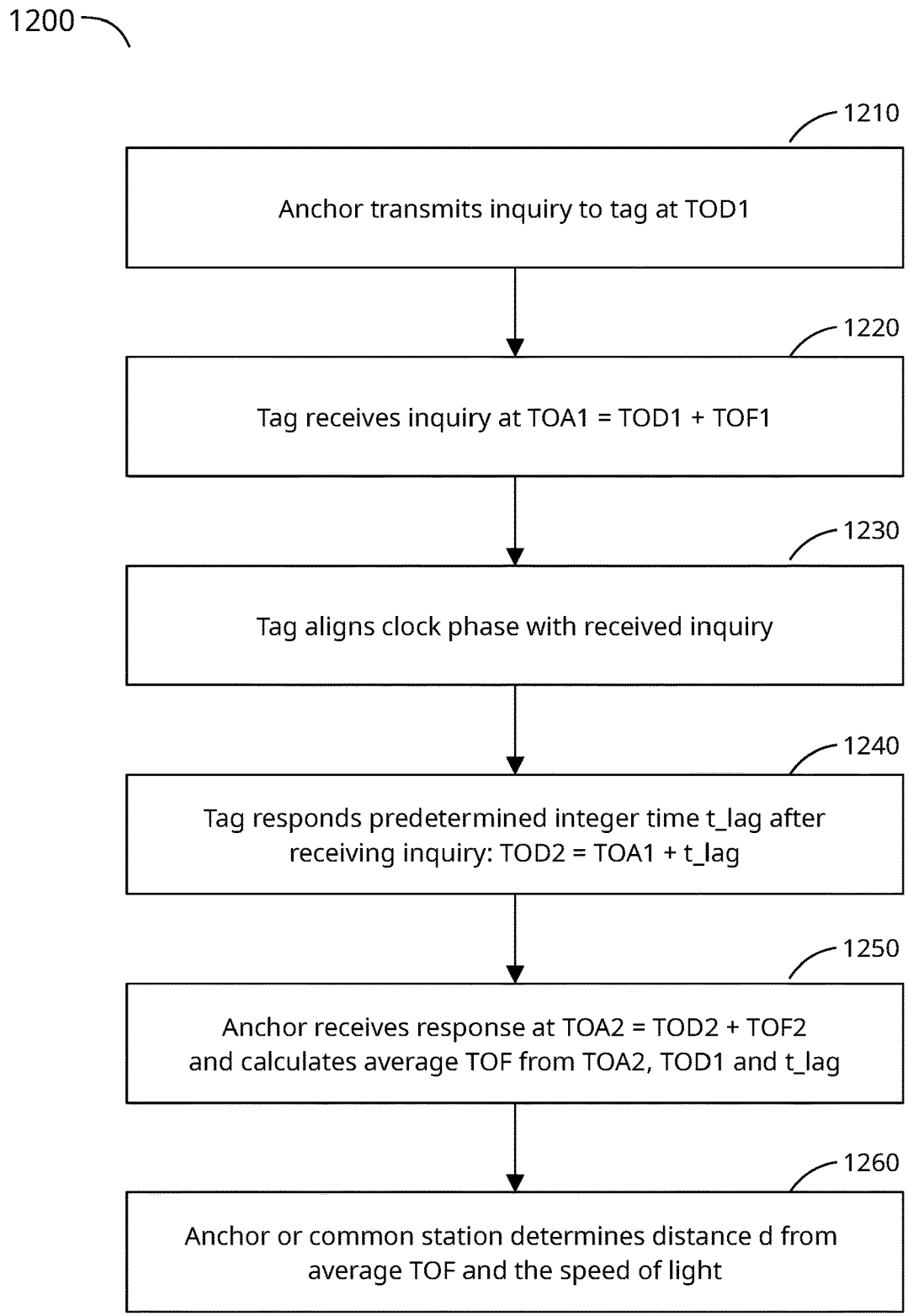
FIG. 12 - Positioning with Two-Way TOA

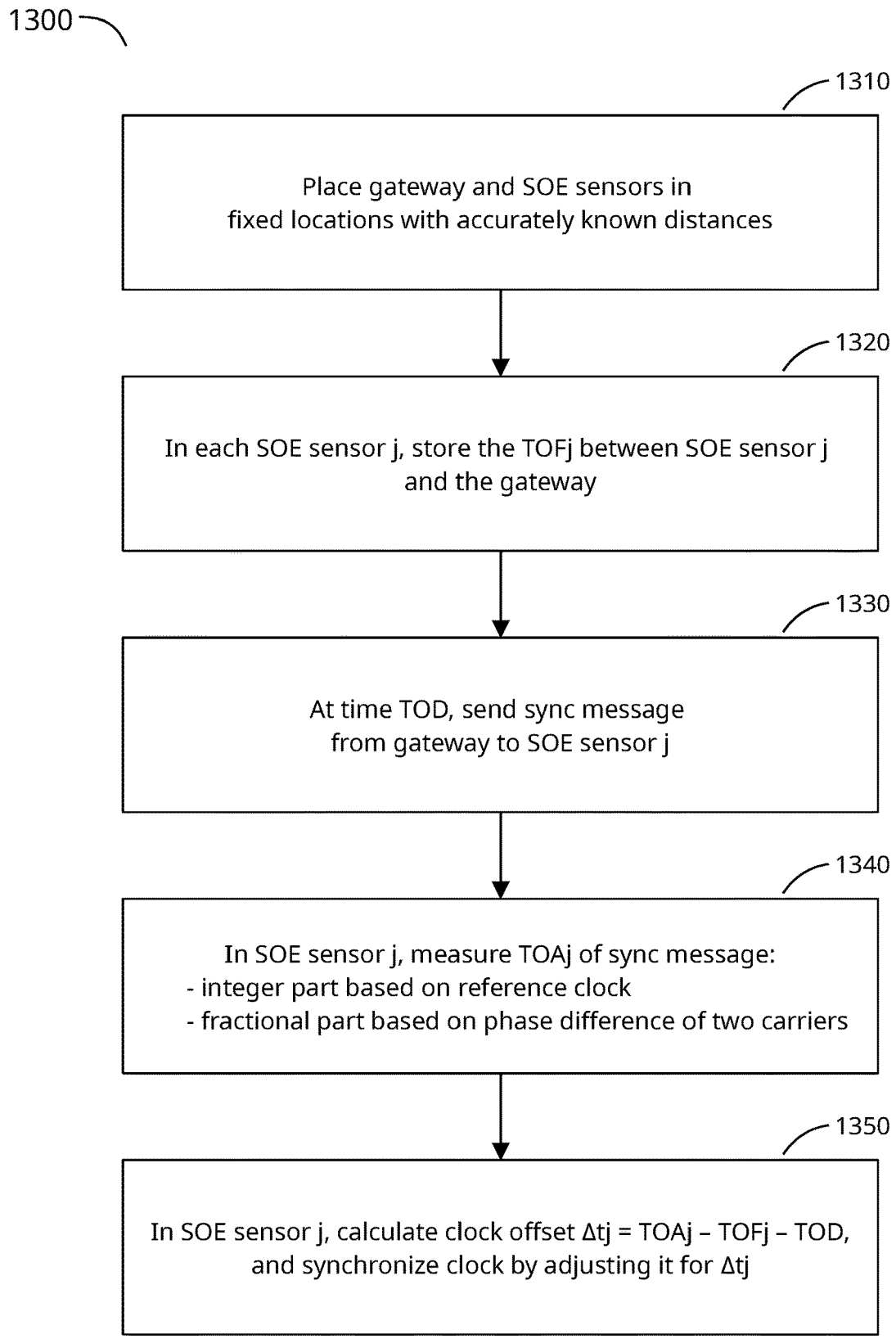
FIG. 13 - SOE Sensor Synchronization with TOA

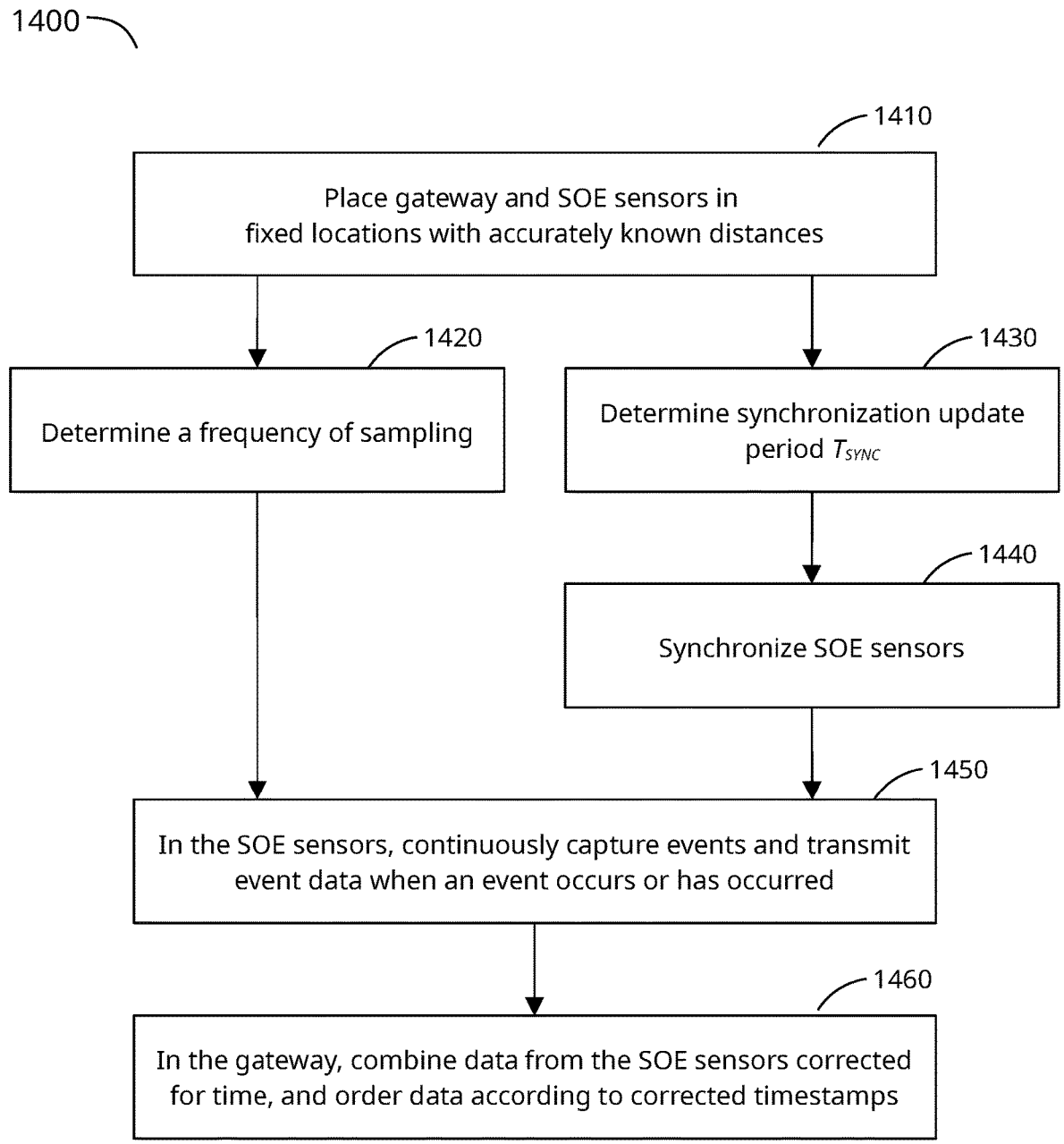
FIG. 14 - SOE Monitoring

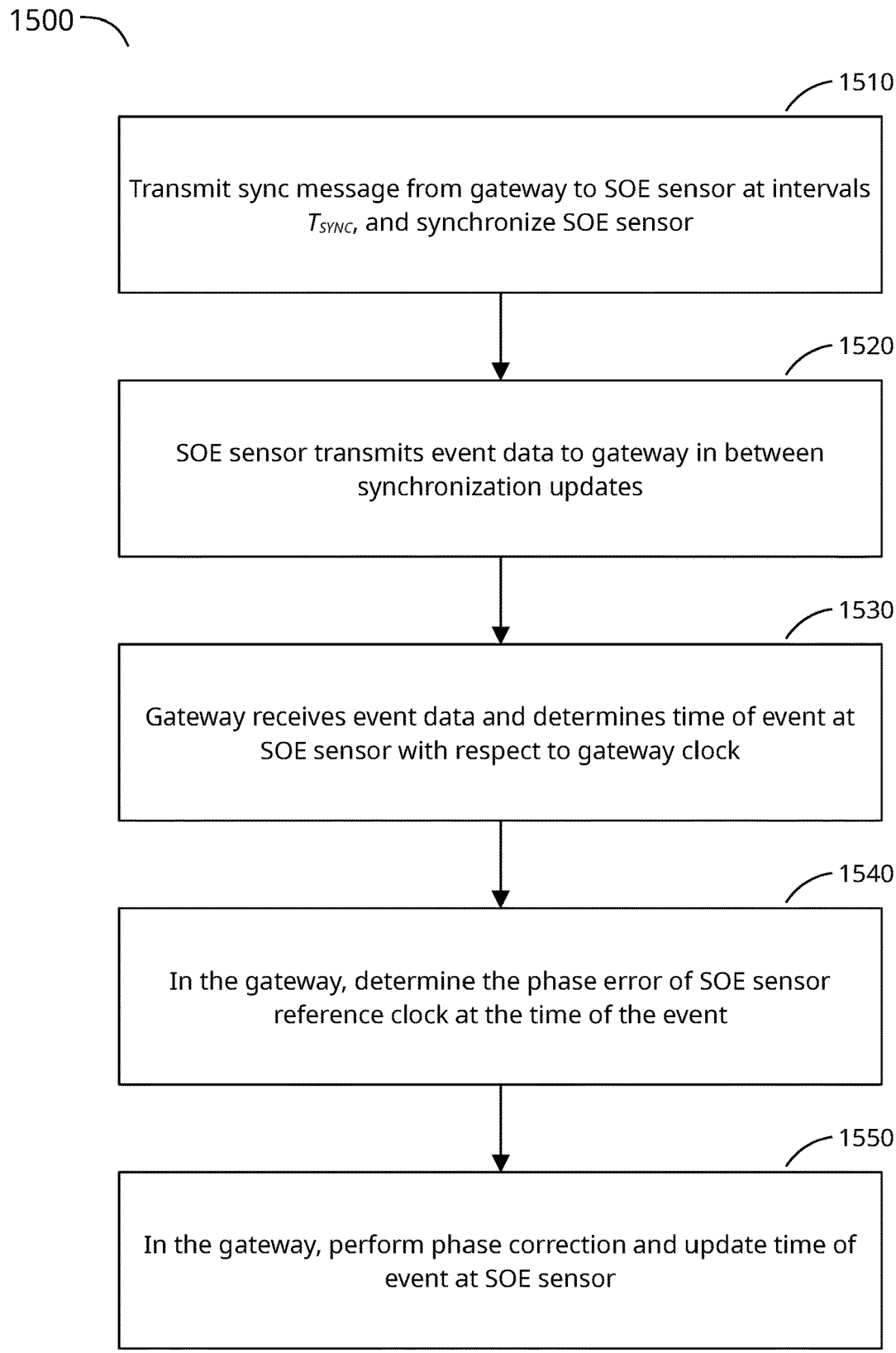
FIG. 15 - Phase Correction for High-Precision SOE

ACCURATE CLOCK SYNCHRONIZATION AND LOCATION DETECTION IN TIME-SENSITIVE WIRELESS NETWORKS

CROSS REFERENCES TO RELATED APPLICATIONS

This application claims priority from U.S. Provisional Patent Application Ser. No. 63/226,887, entitled "Accurate Clock Synchronization and Location Detection in Time-Sensitive Wireless Network", filed on 29 Jul. 2021, which is hereby incorporated by reference as if set forth in full in this application for all purposes.

BACKGROUND

Technical Field

The disclosed implementations relate generally to systems and methods used in wireless location detection, and in particular to those related to geolocation, wireless sensor networks, indoor networks, and conditions where reception may be difficult.

Context

Unless otherwise indicated herein, elements described in this section are not prior art to the claims and are not admitted being prior art by inclusion in this section.

Location detection systems allow determining the location of a tag in the presence of anchors whose locations are accurately known. These systems rely on communication between the tag and the anchors, and the durations for radio signals to travel between the anchors and the tag. These durations are commonly called time of flight (TOF). Since radio signals travel at the speed of light c, the TOF relates directly to a distance between the tag and an anchor. Most modern location detection systems operate digitally, using an internal reference clock to operate digital logic, measure a signal's time of arrival (TOA) and calculate the TOF. This requires that a time of transmission or time of departure (TOD) be known or can be calculated. In some location detection systems, such as radar, the tags (targets) are passive, and communication from the tag to the anchor takes place merely in the form of reflecting the radar signal. In those cases, an accurate detection of the tag's location in an M-dimensional space requires the involvement of M anchors. Each anchor determines a TOF by measuring the time span between transmission of a signal and first reception of a reflection, and dividing the result by two. The tag's position is determined by combining the M TOF results. The anchors may use radio frequencies that are unrelated, and individual reference clocks that are unsynchronized. The tag may never be aware that its location has been detected.

In other location detection systems, a tag may cooperate by transmitting information. Such cooperation may not be intentional. For example, in the case of positioning an illegal radio transmitter (the tag, e.g. a "pirate station"), M+1 anchors in an M-dimensional space may determine M+1 differences in TOF by correlating received data. The M+1 differences allow computation of the M coordinates in the M-dimensional space. The tag's reference clock may be unknown, or even non-existent. Illegal radio stations may also be located by triangulation of two or more angles of reception.

In yet other location detection systems, such as GPS, a tag determines its location, and the anchors may be unaware which tags exist, and which tags are currently determining their locations. In such a system, communication is in one direction (from the anchors to the tag). The anchors must transmit on accurately known radio frequencies, and their transmissions must be fully synchronized in time, i.e., the anchors must use a common reference clock. If a tag has access to the anchors' reference clock, then accurate positioning in an M-dimensional space requires the involvement of M anchors. If the tag does not have such access, then the involvement of M+1 anchors is required.

In further location detection systems, such as a wireless sensor network, anchors (for example, routers) may determine a tag's position (for example, a sensor's position), and the tag may be proactively or actively involved in the process. In case of proactive involvement, the tag transmits messages that are received by the anchors. The anchors may determine the tag's position using a system called time difference of arrival (TDOA), requiring M+1 anchors in an M-dimensional space. In case of active involvement, the tag responds to anchor requests, and the tag basically acts as a transponder. The anchors may determine the tag's position using a system that is called two-way time of arrival (TOA). The tag first needs to recognize the anchor's transmission, which may take some time, so the response follows the signal's reception. Generally, in wireless sensor networks, the anchors must use reference clocks that are synchronized in frequency and phase. However, tags may suffer from phase drift and at least some frequency drift.

Conventional location detection systems that depend on calculation of TOF (calculated from either TOA or TDOA) have their accuracy limited by various conditions, including noise, interference, doppler, and the resolution of their reference clocks. For example, a conventional system may use a reference clock of 10 MHz, which has a clock cycle of 100 ns. During one clock cycle, a radio signal travels $10^{-7} \times 300 \times 10^6$ meters, i.e. 30 meters. Thus, the conventional system would have a best resolution of 30 meters. While increasing the reference clock frequency improves the resolution, it comes at the cost of a higher power consumption, which may not always be possible. For example, tags in a wireless sensor network typically have very limited power available.

Location detection systems also use other techniques. They may use the angle of reception. By rotating an omnidirectional antenna, the doppler effect results in frequency modulation of the received signal. The modulation can be detected, providing a direct measure for the angle of reception. This method may suffer from multipath conditions. The angle of reception can also be determined in a multiantenna system. Receivers may further use the received signal strength indicator (RSSI), since the received signal strength reduces with the distance. This method requires knowledge about the transmission power, and the transmit and receive antenna characteristics. It is not very accurate, due to fading, multipath conditions, noise, variation of the voltage standing wave ratio (VSWR), variation of the gain of the receiver's automatic gain correction (AGC), and other factors. Other techniques include determining the code phase (the time of receiving a known code, such as a sync signal, in a received signal), which may be used in the TOA and TDOA methods.

FIG. 1 gives an overview of some example positioning systems, including radar, wireless sensor networks, GPS, and determining the location of a pirate station. Many systems use TOA or TDOA, however, other techniques such as triangulation of the angle of reception are also in use. A wireless sensor network may use either TDOA, TOA, or two-way TOA. In the case of GPS, the position is calculated by the tag, whereas in the other example systems the tag position is calculated at a common station that is in communication with the anchors, or at an anchor. In some cases, anchors transmit. In other cases, tags transmit. In yet other cases, both anchors and tags transmit. To determine a position in an M-dimensional space, TOA systems need at least M anchors and most TDOA systems need at least M+1 anchors. In two-way TOA systems, anchors don't need to be synchronized.

Some wireless sensor networks are employed to log events and to determine an accurate sequence of the events (SOE). Like positioning systems, those networks rely on TDOA and TOA methods to determine the time of the events.

The accuracy of TDOA and TOA methods is often limited to 10 to 30 meters, or the order of 30 to 100 nanoseconds due to the reference clock frequency that receivers use for sampling the received data. An increased reference clock could provide better accuracy (at the cost of increased power), but noise generally limits the accuracy that can be achieved. The impact of noise can be limited by repeating the process many times, but that comes at both increased power usage and waiting time.

SUMMARY

Location detection (or ranging) systems allow determining the location of a tag in the presence of anchors whose locations are accurately known. These systems rely on communication between the tag and the anchors, and the durations for radio signals to travel between the anchors and the tag.

Some wireless sensor networks focus on detecting events measured by the various sensors, and recording the events centrally, along with their time. Event times may need to be logged with very high precision, for example in the order of nanoseconds, to establish an accurate sequence of events (SOE).

Ranging and sequence of events monitoring rely on the same physical parameters, and can both be implemented by the technology disclosed herein.

In conventional systems, the accuracy of both applications is limited but the cycle time of a reference clock, or the distance traveled by a radio wave during the cycle time of the reference clock. For example, if anchors and tags use a reference clock of 10 MHz, then the precision in time was limited to 100-ns (the duration of one reference clock cycle) and the precision in location was limited to 30 meters (the distance traveled by a radio wave in 100 ns).

Implementations of the technology described herein transmit messages at two different carrier frequencies, each an integer of the reference clock. The carrier frequencies are phase-aligned with the reference clock. The phase difference of the two carrier frequencies at the point of reception is a measure of the fraction of the reference clock cycle time, or of the distance traveled by a radio wave during that time.

In a first aspect, an implementation provides a system for accurate and low-power positioning. The system includes a common station configured for communication with two or more anchors. The common station and the two or more anchors are located in fixed, accurately known positions. It further includes a tag that is configured for wireless communication with the two or more anchors. The common station, the two or more anchors, and the tag each use a reference clock for clocking transmit data and/or receive data. The common station is configured for synchronizing the reference clocks of the two or more anchors to a reference frequency and to a reference phase of the common station reference clock. The wireless communication between the tag and the two or more anchors uses two carrier frequencies, that are phase-synchronized to a transmitter reference clock frequency and to a transmitter reference clock phase. The difference between the two carrier frequencies equals an integer times the transmitter reference clock frequency. A receiver samples receive data in a received signal at a receiver reference clock frequency, and the received signal includes the two carrier frequencies. The receiver determines an integer number of reference clock wavelengths from the sampled receive data. It also determines a fractional part of the reference clock wavelength from the phase difference between the two carrier frequencies at the time of sampling the receive data. The implementation determines the distance between the receiver and the transmitter by adding the fractional part of the reference clock wavelength and the integer number of reference clock wavelengths.

In a second aspect, an implementation provides a method for transmitting and receiving a message. The method has the following steps. A transmitter at a first location transmits the message at a symbol rate of the reference clock using a first RF carrier, whose phase is locked to a phase of the reference clock and whose frequency is a first integer times a frequency of the reference clock. It also transmits the message at the symbol rate of the reference clock using a second RF carrier, whose phase is locked to the phase of the reference clock and whose frequency is a second integer times the frequency of the reference clock. The second integer is unequal to the first integer. A receiver at a second location receives the message at the first RF carrier and at the second RF carrier, and accurately determines a time of a first phase difference between the first RF carrier and the second RF carrier. It determines a time of receiving the message from the time of the first phase difference. The first phase difference may substantially equal zero.

In a third aspect, an implementation provides a method for synchronizing a sensor in a wireless network for sequence of events monitoring. The method has the following steps. A gateway and two or more sensors are placed in fixed locations with accurately known relative distances. The first sensor stores a time of flight between the first sensor and the gateway. The gateway sends a synchronization message to the first sensor at a first time, measured using a gateway clock. The first sensor receives the synchronization message and measures the time of arrival of the synchronization message using the first sensor's clock. The first sensor calculates an offset by subtracting the first time and the time of flight from the second time, and synchronizes the first sensor clock by adjusting it for the offset.

In a fourth aspect, an implementation provides a method for monitoring a sequence-of-events (SOE) wireless network. The method has the following steps. A gateway and two or more sensors are placed in fixed locations with accurately known relative distances. A frequency of sampling is determined based on an inverse of a required timestamp precision. The method determines a synchronization update period. It synchronizes the two or more sensors with the gateway. In the two or more sensors, events are captured and when an event has occurred, event data are transmitted to the gateway. The gateway: (1) receives event data from the two or more sensors, (2) corrects time information included in the event data to obtain corrected event data; (3) combines the corrected event data from the two or more sensors; and (4) orders the corrected event data according to time information included in the corrected event data to obtain a sequence of events.

A further understanding of the nature and the advantages of particular implementations disclosed herein may be realized by reference of the remaining portions of the specification and the attached drawings.

BRIEF DESCRIPTION OF THE DRAWINGS

The technology will be described with reference to the drawings, in which:

FIG. 1 gives an overview of some example positioning systems;

FIG. 2 illustrates an example positioning system;

FIG. 3 illustrates how various parts of a received signal are impacted by the time of flight;

FIG. 4 illustrates elements of accurate distance measuring in an implementation of the technology;

FIG. 5 illustrates a method of transmitting and receiving a message in an implementation of the technology;

FIG. 6 illustrates measuring the TOA in an implementation of the technology;

FIG. 7 illustrates an example transmitter;

FIG. 8 illustrates another example transmitter;

FIG. 9 illustrates an example receiver;

FIG. 10 illustrates an example method for anchor synchronization in a positioning system;

FIG. 11 illustrates an example method for accurate positioning with TDOA;

FIG. 12 illustrates an example method for accurate positioning with two-way TOA;

FIG. 13 illustrates a method for synchronizing a sensor in a wireless network for sequence of events monitoring in an implementation of the technology;

FIG. 14 illustrates an example method for monitoring an SOE wireless network; and FIG. 15 illustrates a method for phase correction in a high-precision SOE wireless network in an implementation of the technology.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope, which is defined by the claims. Instead, they merely represent examples of different implementations of the disclosed technology.

DETAILED DESCRIPTION

Terminology

As used herein, the phrase "one of" should be interpreted to mean exactly one of the listed items. For example, the phrase "one of A, B, and C" should be interpreted to mean any of: only A, only B, or only C.

As used herein, the phrases "at least one of" and "one or more of" should be interpreted to mean one or more items. For example, the phrase "at least one of A, B, and C" or the phrase "at least one of A, B, or C" should be interpreted to mean any combination of A, B, and/or C.

Unless otherwise specified, the use of ordinal adjectives "first", "second", "third", etc., to describe an object, merely refers to different instances or classes of the object and does not imply any ranking or sequence.

The term "coupled" is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term "connected" is used to indicate a direct connection, such as electrical, optical, electromagnetical, or mechanical, between the things that are connected, without any intervening things or devices.

ADC—analog-to-digital converter.

Anchor—an entity with a fixed and accurately known position, relative to which the position of a tag may be determined. For example, in GPS the satellites are the anchors.

Chip rate—the number of pulses per second at which a code is transmitted or received.

Common station—an entity with a fixed and accurately known position, relative to whose reference clock an anchor may be synchronized. In positioning systems with multiple anchors, the common station may combine results obtained by the anchors to determine the position of a tag.

DAC—digital-to-analog converter.

GPS—Global Positioning System.

PLL—Phase-locked loop.

RF—"radio frequency" is a range of frequencies of electromagnetic signals used for transmission of radio waves, historically starting at around 20 kHz, and currently up to at least 300 GHz.

Reference clock—the clock used for clocking logic and sampling data in an anchor or a tag. The reference clock frequency may equal the chip rate.

RSSI—received signal strength indicator—a measurement of the power present in a received radio signal.

SOE—sequence of events.

Tag—an entity that may move and whose position is determined. For example, in GPS the GPS receiver is a tag. In some positioning systems, the tag determines its position. In other positioning systems, an anchor or a common station determines the tag's position.

TOA—time of arrival, the time a radio signal is received. A positioning system that uses (one-way) TOA may rely on a tag and an anchor using fully synchronized reference clocks, i.e., both the frequency and phase of the reference clocks are the same. In implementations where the tag transmits and the anchor receives, the tag transmits at a predetermined time (the time of departure (TOD)), or embeds the TOD in the transmitted message. The anchor receives the message and determines the time of flight TOF from the difference between the time of arrival TOA and the TOD. It can calculate the distance by multiplying the TOF with the speed of light. In implementations where the anchor transmits and the tag receives, the anchor transmits at a predetermined TOD, or embeds the TOD in the transmitted message. The tag receives the message and determines the time of flight TOF from the difference between the time of arrival TOA and the TOD. See also the description of two-way TOA.

TOD—time of departure, see TOT.

TOT—time of transmission, the time a radio signal is transmitted.

TDOA—time difference of arrival. The difference between the TOA of a first received signal and a second received signal.

Two-way TOA. A two-way TOA method to determine the distance between an anchor and a tag may not rely on the anchor and the tag using fully synchronized reference clocks. However, for the method to be accurate, the tag's reference clock must be at the same frequency as the anchor's reference clock. In some implementations, the anchor transmits a request, and the tag responds a fixed, known time t_lag after receiving the request. In other implementations, the tag transmits a request, and the anchor responds the fixed, known time t_lag after receiving the request. When the requestor receives the response, it calculates the time of flight from the time of receiving the response, the time of transmitting the request, and t_lag.

TOF—time of flight.

VSWR— voltage standing wave ratio. The ratio of the maximum and minimum voltage on a lossless transmission line.

Implementations
Ranging

FIG. 2 illustrates an example positioning system 200. Positioning system 200 includes a common station 210, two or more anchors 220, and a tag 230. Positioning system 200 uses TDOA or 2-way TOA to determine the position of tag 230. Common station 210 and the two or more anchors 220 are located in fixed positions that are accurately known. Common station 210 is configured to communicate with the two or more anchors 220. Tag 230 may move around, and its position must be determined. Tag 230 is configured to communicate with the two or more anchors 220. Common station 210, the two or more anchors 220, and tag 230 each use a reference clock for clocking transmit data and/or receive data, as the case may be. Common station 210 synchronizes reference clocks of the two or more anchors 220 in frequency and phase, as further detailed in reference to FIG. 10. In some implementations, common station 210 determines the position of tag 230. In other implementations, tag 230 determines its position, or one of the two or more anchors 220 determines the tag 230 position. In the examples in this patent document, focus is given on common station 210 determining the tag 230 position. To determine the tag 230 position in an M-dimensional space, an implementation using 2-way TOA includes at least M anchors. An implementation using TDOA uses at least M+1 anchors. Each of the M anchors serves to determine a distance (d1 ... dM) between the anchor and tag 230, based on a time of flight (TOF1 ... TOFM) for electromagnetic signals to travel between the anchor and the tag. In the case of TDOA, the extra anchor serves to eliminate uncertainty about the tag's reference clock frequency and phase. Common station 210 may combine the M measured distances to calculate the tag 230 position. Implementations, whether they use TOA, two-way TOA, or TDOA use very accurate alignment of the reference clocks, as further detailed in this document.

FIG. 3 illustrates how various parts of a received signal are impacted by the time of flight. In this example 300, an anchor 310 and a tag 320 are at a distance d of one another. A message between anchor 310 and tag 320 will have a time of flight TOF, $$TOF = \frac{d}{c} \tag{1}$$

wherein c equals the speed of light. In some implementations, anchor 310 transmits and tag 320 receives. In other implementations, tag 320 transmits and tag 320 receives. The transmitted signal may be of the general form:

$$s_T(t)=A(t)u(t)e^{(j2\pi f_c t)} \tag{2}$$

wherein A(t) equals the amplitude at time t, u(t) is the unit step function which equals 0 for t<0 and 1 for t≥0, and $f_c$ is the carrier frequency. Assuming a channel with average white Gaussian noise (AWGN), the signal at the receiving antenna will be of the form:

$$s_R(t)=\sqrt{L_P}A(t-\text{TOF})u(t-\text{TOF})e^{j2\pi f_c(t-\text{TOF})}+n(t) \tag{3}$$

wherein $L_p$ is the path loss factor through the channel, and n(t) is the AWGN at time t. Formula (3) indicates various ways that TOF or the distance can be determined. First, the RSSI can be used to estimate the path loss factor, which is related to the distance. However, it requires knowledge of several other factors, some of which are not in control of the positioning system. Thus, such a method can at best be coarse. If the message includes a code known to both the transmitter and the receiver, then this code may be included as a pulsed shape in A(t) and can be recognized in A(t−TOF). The receiver detects the group delay of the pulsed shape (the "code phase") from which it can determine the delay, provided that the receiver and transmitter have synchronized reference clocks. The resolution of this method is limited by the reference clock. If one cycle of the reference clock travels a distance $d_{REFCLK}$, then the resolution is limited to $d_{REFCLK}$. Note that $d_{REFCLK}$ equals the wavelength of the reference clock should it be transmitted directly. Another possible method utilizes the unit step, i.e., it determines when the message starts being received. This is similar to a sync detection. However, the method is very susceptible to noise. Its resolution is also limited to $d_{REFCLK}$. The last method is to look at the carrier phase, as shown in $e^{(j2\pi f_c(t-TOF))}$. Because the carrier frequency is much higher than the reference clock, this method is potentially much more accurate than the other methods mentioned. An implementation uses the carrier phase to accurately determine when one reference clock cycle in the received signal ends and the next one starts. The implementation may use the code phase, or even the RSSI and the sync detect, to measure the whole number (integer part) of $d_{REFCLK}$ in distance d, and the carrier phase to measure the fraction of $d_{REFCLK}$— i.e., the fractional part of $d_{REFCLK}$ in distance d.

FIG. 4 illustrates elements of accurate distance measuring 400 in an implementation of the technology. A transmitter TX and a receiver RX are a distance $d_{TXRX}$ apart. The implementation determines $d_{TXRX}$ as a multiple of $d_{REFCLK}$, wherein the multiple has an integer part $n_{INT}$ and a fractional part $n_{FRAC}$. Thus, $d_{TXRX}=(n_{INT}+n_{FRAC})*d_{REFCLK}$. The implementation determines $n_{INT}$ using any conventional method, or combination of conventional methods. To determine the fractional part $n_{FRAC}$, the implementation needs to determine very accurately where one cycle of the reference clock stops and the next one begins. To do so, the implementation transmits and receives at two carrier frequencies. The two carriers are aligned in phase with the reference clock. The two carrier frequencies are each a multiple of the reference clock frequency, and they are an integer multiple $m_{INT}$ of the reference clock frequency apart. For example if $m_{INT}=1$, a reference clock may be 30 MHz, the first carrier may be at 80*30=2,400 MHz, and the second carrier may be at 81*30=2,430 MHz. The phase difference between the first carrier and the second carrier equals 0 at the beginning of a reference clock cycle (since they are both phase aligned with the reference clock), and linearly increases to $m_{INT}*2\pi$ at the end of the reference clock, where it goes down to 0 to repeat for the next cycle. Thus, the phase difference between the two received carriers (divided by $m_{INT}*2\pi$) is an accurate measure for $n_{FRAC}$.

An implementation may transmit the two carriers simultaneously, in which case a receiver might detect the phase difference by comparing two received signals with each other, or an implementation may transmit the two carriers at different times, in which case a receiver might detect the phase difference by comparing the two received signals each with a receiver internal clock that is locked to the receiver's reference clock. In this case, the receiver's reference clock must be free of drift, or it must have a known drift, or an implementation may carry out multiple measurements to cancel a drift component. Implementations with simultaneous transmission may provide frequency diversity, and implementations with successive transmission may provide time diversity.

Measuring the phase difference directly may suffer from strong noise, so an implementation applies noise averaging to achieve the best resolution. Several ways of noise averaging are known in the art, and implementations may use each one of those. One implementation uses a Costas loop to get an average phase difference with respect to known replica symbols for the two carriers over multiple symbols.

FIG. 5 illustrates a method 500 of transmitting and receiving a message in an implementation of the technology. Method 500 comprises the following steps.

Step 510—in a transmitter a first location, transmitting the message at a symbol rate of a reference clock using a first RF carrier, whose phase is locked to a phase of the reference clock and whose frequency is a first integer times a frequency of the reference clock. An analog or mixed-signal implementation may use a first PLL to lock the phase and frequency of the first carrier to the reference clock. A digital implementation may use an inverse DFT to generate and modulate the first RF carrier.

Step 520—in the transmitter at the first location, transmitting the message at the symbol rate of the reference clock using a second RF carrier, whose phase is locked to a phase of the reference clock and whose frequency is a second integer times the frequency of the reference clock, wherein the second integer is unequal to the first integer. The analog or mixed-signal implementation may use a second PLL to lock the phase and frequency of the second carrier to the reference clock. The digital implementation may use the inverse DFT to generate and modulate the second RF carrier.

Step 530—in a receiver at a second location, receiving the message at the first RF carrier and at the second RF carrier, and accurately determining a time of a first phase difference between the first RF carrier and the second RF carrier. An analog implementation may use a Costas loop to determine the time of the first phase difference. A digital implementation may use a synchronized DFT to determine the time of the first phase difference, and to demodulate the message.

Step 540—from the time of the first phase difference, determining a time of receiving the message. In an example implementation, the first phase difference could substantially be zero, for example within a margin from −36 to +36°. When the first RF carrier and the second RF carrier are in accurate phase lock with the reference frequency, the time of the first phase difference coincides with the time of the start of a reference clock pulse. However, the time of the first phase difference can be measured much more precisely than the start of the reference clock, since it is measured with the resolution of the RF carriers rather than the resolution of the reference clock. In the example of the first phase being within a margin from −36 to +36°, the implementation can still measure the timing ten times more accurate than relying on conventional methods based on the reference frequency only. Thus, method 500 can provide an accurate measurement of $n_{FRAC}$, as described with reference to FIG. 4.

FIG. 6 illustrates a method 600 for measuring the TOA in an implementation of the technology. Method 600 includes two steps, that may be carried out in any order.

Step 610—measuring an integer part of a time of arrival TOA based on the receiver reference clock.

Step 620—measuring a fractional part of the TOA based on the receiver reference clock, and based on a time difference between a receiver reference clock active edge and phase equality of two received carriers.

FIG. 7 illustrates an example transmitter 700. Transmitter 700 includes reference clock generator 710, which may include a crystal oscillator, message generator 720, first phase-locked loop 730 (PLL1), second phase-locked loop 735 (PLL2), first modulator 740 (Mod1), second modulator 745 (Mod2), RF adder 750, power amplifier 760, which may include an RF filter, and antenna 770. Reference clock generator 710 outputs a reference clock $f_{REF}$, which clock it outputs to message generator 720, first phase-locked loop 730, and second phase-locked loop 735. Message generator 720 outputs message data at a rate of one symbol per clock, e.g. 1 bit in case of BPSK modulation, or 2 bits in case of QPSK modulation, etc. First phase-locked loop 730 takes the reference clock at its input, and outputs a first carrier with frequency $N_1 f_{REF}$, which it forwards to first modulator 740. Second phase-locked loop 735 takes the reference clock at its input, and outputs a second carrier with frequency $(N_1+m_{INT})f_{REF}$, which it forwards to second modulator 745. First modulator 740 and second modulator 745 may modulate the first and second carrier with the message data in any modulation type known in the art, including but not limited to BPSK, QPSK, M-PSK, QAM, PAM, etc., and forward the modulated carriers to RF adder 750. First modulator 740 and second modulator 745 may use the same modulation type, or different modulation types. Power amplifier 760 amplifies the two carriers and forwards them to antenna 770, which transmits them. Some implementations may not use RF adder 750, but instead separately amplify and transmit the modulated carriers, thus requiring two power amplifiers and two antennas. Yet other implementations may use separate power amplifiers, but add the two amplified modulated carriers before passing them on to the jointly used antenna 770. An implementation that transmits the first and second carrier sequentially may use the architecture shown in FIG. 7, in which case either first modulator 740 or second modulator 745 may be operable at any time, or in which case RF adder 750 may be replaced by a selector. Alternatively, an implementation that transmits the first and second carrier sequentially may use a single PLL and/or a single modulator, and change frequency between a first and a second transmission.

FIG. 8 illustrates another example transmitter 800. Transmitter 800 includes reference clock generator 810, which may include a crystal oscillator, message generator 820, phase-locked loop 830 (PLL), inverse discrete Fourier transformer 840 (IDFT), digital-to-analog converter 850 (DAC), power amplifier 860, which may include an RF filter, and antenna 870. Transmitter 800 is based on the fact that the reference clock and the two carriers are orthogonal signals. Phase-locked loop 830 generates a clock $N*f_{REF}$ that is, for example, 256 times as high as the reference clock (N=256). This allows inverse discrete Fourier transformer 840 to modulate the message data in a 256-point DFT, converting the message data from the frequency domain to the time domain at carriers that are $N_1$ and $N_1+m_{INT}$ times the reference frequency. Digital-to-analog converter 850 converts the digital time-domain data to the analog domain, where they are amplified by power amplifier 860 and transmitted by antenna 870.

FIG. 9 illustrates an example receiver 900. Receiver 900 includes channel A antenna 910 and channel B antenna 911, channel A LNA 914 (low-noise amplifier) and channel B LNA 915. Some implementations may combine channel A antenna 910 and channel B antenna 911 in a single antenna and channel A LNA 914 and channel B LNA 915 in a single LNA. The channel A LNA 914 output is coupled with first inputs of first channel A mixer 922 and second channel A mixer 924. The channel B LNA 915 output is coupled with first inputs of first channel B mixer 923 and second channel B mixer 925. A reference clock oscillator 916, which may include a crystal oscillator, feeds reference clock inputs of first PLL 918 and second PLL 919. First PLL 918 is configured to output in-phase (I) and quadrature (Q) output clocks whose frequency equals $N_1 f_{REF}$, and second PLL 919 is configured to output I and Q output clocks whose frequency equals $(N_1+m_{INT})f_{REF}$. The I and Q outputs of first PLL 918 are coupled with second inputs of first channel A mixer 922 and second channel A mixer 924, respectively. The I and Q outputs of second PLL 919 are coupled with second inputs of first channel B mixer 923 and second channel B mixer 925, respectively.

The output of first channel A mixer 922 is coupled with first channel-A ADC 930 and first channel-A filter 940 to deliver channel-A I data 950. The output of second channel A mixer 924 is coupled with second channel-A ADC 932 and second channel-A filter 942 to deliver channel-A Q data 952. The output of first channel B mixer 923 is coupled with first channel-B ADC 931 and first channel-B filter 941 to deliver channel-B I data 951. The output of second channel B mixer 925 is coupled with second channel-B ADC 933 and second channel-B filter 943 to deliver channel-B Q data 953.

Receiver 900 includes a Costas loop formed by complex multiplier 960, integrate and dump circuit 962, trigonometric module 964, which may calculate an arctan function, and which may comprise a coordinate rotation digital computer (CORDIC), loop filter 966, and digitally-controlled oscillator 968, which outputs I and Q signals to complex multiplier 960. The I and Q data of channel A (channel-A I data 950 and channel-A Q data 952) are inputs to integrate and dump circuit 962, whereas the I and Q data of channel B (channel-B I data 951 and channel-B Q data 953) are inputs to complex multiplier 960. The signal at the output of integrate and dump circuit 962 is a phase output, signaling the phase difference between the received channel A and channel B data.

As an alternative to the receiver in FIG. 9, a receiver may convert a received signal to digital by an ADC that feeds a forward digital Fourier transform (DFT) block, which may directly output the I and Q data for channel A and channel B, and which may feed the Costas loop to determine the phase difference.

FIG. 10 illustrates an example method 1000 for anchor synchronization in a positioning system. The positioning system may, for example, be positioning system 200 described with reference to FIG. 2. Method 1000 comprises the following steps.

Step 1010—placing a common station and two or more anchors in fixed locations that are accurately known. In some implementations, the common station includes a gateway.

Step 1020—in each of the two or more anchors, storing a TOF between the anchor and the common station. The TOF can be accurately determined from the spatial distance between anchor's and the common station's fixed locations by dividing the spatial distance by the speed of light.

Step 1030—at time of departure TOD, sending a sync message from the common station to each of the two or more anchors. TOD may be prearranged, and thus known to the two or more anchors, or TOD may be embedded in the sync message.

Step 1040—in each of the two or more anchors, measuring a TOA of the sync message. The anchor may measure the TOA in integer parts of its reference clock by using any method known in the art, including RSSI, code phase, and code sync. The anchor may measure a remaining fractional part of its reference clock by determining a time between an active edge of the reference clock and phase equality of two carriers included in the sync message.

Step 1050—in each of the two or more anchors, calculating a clock offset $\Delta t$ by subtracting the TOF and the TOD from the TOA, and synchronizing its reference clock by adjusting it for the clock offset $\Delta t$.

FIG. 11 illustrates an example method 1100 for accurate positioning with TDOA. The positioning system may, for example, be positioning system 200 described with reference to FIG. 2. Method 1100 comprises the following steps.

Step 1110—placing a common station and two or more anchors in fixed locations that are accurately known. In some implementations, the common station includes a gateway.

Step 1120—for each of the two or more anchors, synchronizing its reference clock to the frequency and phase of the common station reference clock.

Step 1130—from the tag, transmitting a tag message at a time of departure (TOD), Step 1140—in each of the two or more anchors, measuring a TOA of the tag message. The anchor may measure the TOA in integer parts of its reference clock by using any method known in the art, including RSSI, code phase, and code sync. The anchor may measure a remaining fractional part of its reference clock by determining a time between an active edge of the reference clock and phase equality of two carriers included in the tag message.

Step 1150—in the common station, calculating one or more distances from the two or more anchors' measured TOAs.

FIG. 12 illustrates an example method 1200 for accurate positioning with two-way TOA. The positioning system may, for example, be positioning system 200 described with reference to FIG. 2. Method 1200 comprises the following steps.

Step 1210—in an anchor, whose location is fixed and accurately known, transmitting an inquiry at a first time of departure TOD1.

Step 1220—in a tag, receiving the inquiry and measuring its time of arrival TOA1.

Step 1230—in the tag, aligning a reference clock phase with the received inquiry by determining a time in the inquiry in which there is a zero phase difference between two carrier frequencies included in the inquiry.

Step 1240—in the tag, transmitting a response to the anchor at a second time of departure (TOD2), wherein TOD2 equals TOA1 plus a predetermined time (t_lag).

Step 1250—in the anchor, receiving the response and measuring the response time of arrival TOA2. Calculating an average time of flight TOF by subtracting TOD1 and t_lag from TOA2 to get a first result, and dividing the first result by two to get the average TOF.

Step 1260—in the anchor, or in a common station, determining the distance between the anchor and the tag by multiplying the average TOF by the speed of light.

Sequence of Events Monitoring

Some wireless sensor networks focus on detecting events measured by the various sensors, and recording the events centrally, along with their time. Event times may need to be logged with very high precision, for example in the order of nanoseconds, to establish an accurate sequence of events (SOE). Implementations can provide this level of precision using the circuits and methods described above, and further with the methods described with reference to FIGS. 13-14. The SOE wireless networks in these methods include a gateway and two or more SOE sensors. Both the gateway and the SOE sensors are in fixed locations, whose relative distances are accurately known.

FIG. 13 illustrates a method 1300 for synchronizing a sensor in a wireless network for sequence of events (SOE) monitoring in an implementation of the technology. The method is partially performed in the gateway, and partially in a sensor. Method 1300 comprises the following steps.

Step 1310—placing a gateway and two or more sensors in fixed locations with accurately known relative distances. In some implementations, the absolute locations are known, in other implementations, the relative locations are known.

Step 1320—in a first sensor of the two or more sensors, storing the TOF between the sensor and the gateway. The TOF is known from the distance between the sensor and the gateway, and it equals the distance between the sensor and the gateway, divided by the speed of light.

Step 1330—at a first time (the TOD), measured using a gateway clock, sending a synchronization message from the gateway to first sensor. The synchronization message is sent at two different frequencies, each an integer multiple of the gateway's reference clock, and each in phase with the gateway's reference clock (the symbol transmission clock used by the gateway). The implementation may transmit concurrently at the two different frequencies, or sequentially.

Step 1340—in the first sensor, receiving the synchronization message and measuring a second time (the TOA) using a first sensor's clock. The first sensor may measure the TOA in integer parts of the first sensor's clock by using any method known in the art, including using information from the RSSI, code phase, and/or code sync. The first sensor may measure a remaining fractional part of its reference clock by determining a time between an active edge of a cycle of the first sensor's clock and phase equality of the two carriers used to send the synchronization message.

Step 1350—in the first sensor, calculating an offset (between the first sensor's clock and the gateway clock) by subtracting the first time (TOD) and the time of flight from the second time (TOA), and synchronizing the first sensor clock by adjusting it for the offset.

FIG. 14 illustrates a method 1400 for monitoring an SOE wireless network in an implementation of the technology. The method is implemented partially in the gateway, and partially on two or more SOE sensors. Method 1400 comprises the following steps.

Step 1410—placing a gateway and two or more SOE sensors in fixed locations with accurately known relative distances. In some implementations, absolute locations are known; in other implementations, relative locations are known. In some implementations, method 1400 proceeds in parallel threads, a first thread comprising Step 1420 and a second thread comprising Step 1430 and Step 1440. In other implementations, a single thread may comprise Step 1420, Step 1430, and Step 1440.

Step 1420—determining a frequency of sampling based on an inverse of a required timestamp precision. For example, to achieve a timestamp precision of 10 nanoseconds, the frequency of sampling must be 100 MHz. In this case, an embodiment may use a 100-MHz sampling clock, or four phases of a 25-MHz reference clock, etc. In a parallel thread implementation, method 1400 proceeds with Step 1450. In a single-thread implementation, method 1400 may proceed with Step 1430. In other single-thread implementations, Step 1420 may precede or follow Step 1430 and/or Step 1440.

Step 1430—determining a synchronization update period $T_{SYNC}$. An implementation may derive $T_{SYNC}$ from the required timestamp precision and a maximum allowed residual frequency error as follows:

$$T_{SYNC} = (0.5 * \text{Precision}_{timestamp}) \text{Error}_{frequency} \quad (4)$$

For example, to achieve a 10-ns timestamp precision and a 1-ppm residual frequency error, $T_{SYNC}$ must be 5 ms or better. The implementation proceeds with Step 1440.

Step 1440—synchronizing the two or more SOE sensors. Synchronization may use or include method 1300. Synchronization may further include resetting a clock count to zero, updating $T_{SYNC}$, and modifying the SOE sensor reference clock frequency and the clock phase.

Step 1450—in the two or more SOE sensors, continuously capturing events and transmitting event data to the gateway when an event has occurred. Event data may include sampled data, a corresponding sampling clock count, residual frequency error, synchronization period count, and any other data related to the event or related to the capturing SOE sensor at the time of the event.

Step 1460—in the gateway, receiving event data from the SOE sensors, correcting time information included in the event data to obtain corrected event data, combining the corrected event data from the two or more SOE sensors, and ordering the corrected event data according to time information included in the corrected event data to obtain a sequence of events. Correcting time information may include performing phase correction to accurately match a gateway clock.

FIG. 15 illustrates a method 1500 for phase correction in a high-precision SOE wireless network in an implementation of the technology. The SOE wireless network includes a gateway and an SOE sensor. Method 1500 is partially implemented in the gateway, and includes the following steps.

Step 1510—transmitting a synchronization message from the gateway to the SOE sensor and synchronizing the SOE sensor. An implementation may perform synchronization according to method 1300. The implementation may perform synchronization regularly at intervals $T_{SYNC}$.

Step 1520—in the SOE sensor, transmitting event data to the gateway. The SOE sensor may transmit the event data in between synchronization updates. The event data may include the SOE sensor reference clock count M, the residual frequency error $\text{Error}_{frequency}$, and the sync period count N.

Step 1530—in the gateway, receiving the event data and determining the time of the event at the SOE sensor, relative to the gateway clock:

$$T_{SOE} = (N-1) * T_{SYNC} + M * T_{CLK} \quad (5)$$

wherein $T_{CLK}$ is the cycle time of the SOE sensor reference clock.

Step 1540—in the gateway, determining the phase error of the SOE sensor reference clock at the time of the event. The phase error may, for example, be:

$$\text{Error}_{phase} = M * T_{CLK} * \text{Error}_{frequency} \qquad (6)$$

Step 1550—in the gateway, updating the time of the event at the SOE sensor. For example, the phase corrected time of the event at the SOE sensor may be:

$$T_{SOE} = (N-1) * T_{SYNC} + M * T_{CLK} * (1 - \text{Error}_{frequency}) \qquad (7)$$

Considerations

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, or in a programmable logic device such as a field-programmable gate array (FPGA), obviating a need for at least part of the dedicated hardware. Implementations may be as a single chip, or as a multi-chip module (MCM) packaging multiple semiconductor dies in a single package. All such variations and modifications are to be considered within the ambit of the present technology, the nature of which is to be determined from the foregoing description.

Any suitable technology for manufacturing electronic devices can be used to implement the circuits of particular implementations, including CMOS, FinFET, BiCMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different particular implementations. In some particular implementations, multiple elements, devices, or circuits shown as sequential in this specification can be operating in parallel.

Any suitable programming language can be used to implement the routines of particular implementations including C, C++, Java, JavaScript, compiled languages, interpreted languages and scripts, assembly language, machine language, etc. Different programming techniques can be employed such as procedural or object oriented. Methods embodied in routines can execute on a single processor device or on a multiple processor system. Although the steps, operations, or computations may be presented in a specific order, this order may be changed in different particular implementations. In some particular implementations, multiple steps shown as sequential in this specification can be performed at the same time.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system for accurate and low-power positioning, comprising:
    a common station configured for communication with two or more anchors, wherein the common station and the two or more anchors are located in fixed, accurately known positions; and
    a tag configured for wireless communication with the two or more anchors;
    wherein:
        at least one of the common station, the two or more anchors, and the tag is configured to determine a position of the tag from a first distance between the tag and a first anchor and a second distance between the tag and a second anchor;
        the common station, the two or more anchors, and the tag each include a reference clock and at least one of a receiver or a transmitter, and use the reference clock in the transmitter to time transmitting data and use the reference clock in the receiver to measure times of receiving data;
        the common station is configured for synchronizing the reference clocks of the two or more anchors to a reference frequency and to a reference phase of the common station reference clock;
        the wireless communication between the tag and the two or more anchors uses a transmitter with two carrier frequencies, wherein the two carrier frequencies are phase-synchronized to a transmitter reference clock frequency and to a transmitter reference clock phase, and wherein a difference between the two carrier frequencies equals the transmitter reference clock frequency;
        a receiver samples receive data in a received signal at a receiver reference clock frequency, wherein the received signal includes the two carrier frequencies;
        the receiver determines an integer number of reference clock wavelengths from the sampled receive data, the integer number being zero or greater;

the receiver determines a fractional part of a reference clock wavelength from a phase difference between the two carrier frequencies at a time of sampling the receive data; and a distance between the receiver and the transmitter is determined by adding the fractional part of the reference clock wavelength and the integer number of reference clock wavelengths, wherein the distance between the receiver and the transmitter represents a distance between the tag and one of the two or more anchors.

2. The system of claim 1, wherein the common station includes a gateway.

3. The system of claim 1, wherein the tag includes a sensor.

4. The system of claim 1, wherein one of the two or more anchors includes a router.

5. The system of claim 1, wherein the common station sends a sync message to one of the two or more anchors at a time of departure (TOD), and wherein the one of the two or more anchors calculates a reference clock offset by subtracting a time of flight (TOF) and the TOD from a time of arrival (TOA), and wherein the one of the two or more anchors synchronizes its reference clock by adjusting it for the reference clock offset.

6. The system of claim 5, wherein the TOD is prearranged.

7. The system of claim 5, wherein the TOD is embedded in the sync message.

8. The system of claim 1, wherein the tag transmits a message at a time of departure (TOD), and the two or more anchors calculate one or more distances from one or more time differences of arrival (TDOA).

9. The system of claim 1, wherein:
one of the two or more anchors transmits an inquiry at a first time of departure (TOD1);
the tag receives the inquiry at a first time of arrival (TOA1), wherein TOA1 equals TOD1 plus a first time of flight (TOF1);
the tag aligns a transmitter reference clock phase with a phase included in the received inquiry and determined from the phase difference between the two carrier frequencies at the time of sampling the receive data;
the tag transmits a response to the one of the two or more anchors at a second time of departure (TOD2), wherein TOD2 equals TOA1 plus a predetermined time (t_lag);
the one of the two or more anchors receives the response at a second time of arrival (TOA2), wherein TOA2 equals TOD2 plus a second time of flight (TOF2); and
the common station and/or the one of the two or more anchors calculates a distance between the tag and the one of the two or more anchors based on a speed of light and on an average time of flight calculated from TOA2, TOD1, and t_lag.

10. The system of claim 1, wherein the integer number of reference clock wavelengths is determined from a group delay of a shaped pulse.

11. The system of claim 1, wherein the integer number of reference clock wavelengths is determined from a synchronization code embedded in the received signal.

12. The system of claim 1, wherein the integer number of reference clock wavelengths is determined from a received signal strength indicator (RSSI).

13. The system of claim 1, wherein the phase difference between the two carrier frequencies at the time of sampling the receive data is determined using a Costas loop.

14. The system of claim 1, wherein the phase difference between the two carrier frequencies at the time of sampling the receive data is determined by counting carrier pulses between an active edge of a receiver reference clock and a time when both of the two carrier frequencies have a zero crossing.

15. The system of claim 1, wherein the phase difference between the two carrier frequencies at the time of sampling the receive data is determined by synchronizing a receiver reference clock phase to a time when both of the two carrier frequencies have a zero crossing.

16. The system of claim 1, wherein the phase difference between the two carrier frequencies at the time of sampling the receive data is determined using a discrete Fourier transform (DFT).

* * * * *